(12) United States Patent
Schablin et al.

(10) Patent No.: US 11,167,873 B2
(45) Date of Patent: Nov. 9, 2021

(54) STRETCH FILM WRAPPING SYSTEM

(71) Applicants: Brian A. Schablin, Osakis, MN (US); Dana L. Zierden, Eagle Bend, MN (US)

(72) Inventors: Brian A. Schablin, Osakis, MN (US); Dana L. Zierden, Eagle Bend, MN (US)

(73) Assignee: BRENTON LLC, Alexandria, MN (US)

( * ) Notice: Subject to any disclaimer, the term of this patent is extended or adjusted under 35 U.S.C. 154(b) by 1903 days.

(21) Appl. No.: 14/470,085

(22) Filed: Aug. 27, 2014

(65) Prior Publication Data

US 2015/0075120 A1 Mar. 19, 2015

Related U.S. Application Data

(60) Provisional application No. 61/878,883, filed on Sep. 17, 2013.

(51) Int. Cl.
| | |
|---|---|
| *B65H 18/00* | (2006.01) |
| *B65B 57/02* | (2006.01) |
| *B65B 11/02* | (2006.01) |
| *B65H 16/04* | (2006.01) |
| *G06Q 10/06* | (2012.01) |

(52) U.S. Cl.
CPC ............ *B65B 57/02* (2013.01); *B65B 11/025* (2013.01); *B65H 16/04* (2013.01); *B65B 2210/20* (2013.01); *B65H 2511/11* (2013.01); *B65H 2515/112* (2013.01); *B65H 2553/212* (2013.01); *B65H 2801/81* (2013.01); *G06Q 10/06* (2013.01)

(58) Field of Classification Search
CPC . B65B 57/02; B65B 2011/002; B65B 11/025; B65B 11/045
USPC .......... 53/203, 211, 218, 399, 588, 556, 587
See application file for complete search history.

(56) References Cited

U.S. PATENT DOCUMENTS

| | | | |
|---|---|---|---|
| 4,514,955 A | 5/1985 | Mouser et al. | |
| 6,370,839 B1 | 4/2002 | Nakagawa et al. | |
| 7,114,308 B2 * | 10/2006 | Cox ...................... | B65B 11/045 53/399 |
| 7,538,281 B2 * | 5/2009 | Pottebaum ............ | G01G 19/12 177/211 |
| 7,845,054 B2 | 12/2010 | Schmitz et al. | |
| 8,001,745 B2 | 8/2011 | Carter et al. | |
| 8,276,346 B2 | 10/2012 | Lancaster, III et al. | |
| 8,453,420 B2 | 6/2013 | Schmidt et al. | |
| 2002/0055803 A1 | 5/2002 | Stork et al. | |
| 2003/0042050 A1* | 3/2003 | Stimpson ............... | G01G 3/141 177/132 |
| 2009/0178374 A1 | 7/2009 | Lancaster, III et al. | |

(Continued)

FOREIGN PATENT DOCUMENTS

WO  WO 2009/089279 A1  7/2009

*Primary Examiner* — Eyamindae C Jallow
(74) *Attorney, Agent, or Firm* — Thompson Hine L.L.P.

(57) ABSTRACT

A stretch film wrapping system for wrapping film about loads includes a wrap location for receiving loads to be wrapped; a film dispensing system including a film roll support mandrel assembly supported on a load cell that provides an output indicative of weight of the film roll support mandrel assembly and any film roll mounted thereon; and a control system for receiving the output of the load cell and configured to utilize load cell output to determine amount of film used for wrap operations.

21 Claims, 6 Drawing Sheets

(56) References Cited

U.S. PATENT DOCUMENTS

| | | | | |
|---|---|---|---|---|
| 2009/0293425 A1* | 12/2009 | Carter | ............... | B65B 11/025 |
| | | | | 53/167 |
| 2010/0300049 A1* | 12/2010 | Schmidt | ............ | B65B 11/025 |
| | | | | 53/461 |
| 2012/0175170 A1* | 7/2012 | Martin | ............... | B65B 11/045 |
| | | | | 177/201 |

* cited by examiner

STRETCH FILM WRAPPING SYSTEM

CROSS-REFERENCES

This application claims the benefit of U.S. Provisional Application Ser. No. 61/878,883, filed Sep. 17, 2013, which is incorporated herein by reference.

TECHNICAL FIELD

The present application relates to a system for applying stretch wrap film to loads, such as palletized loads, and more particularly to a stretch wrap film applying machine that utilizes a load cell in connection with the film support mandrel assembly.

BACKGROUND

Palletized loads are typically wrapped in plastic stretch film prior to shipping to stabilize the load on the pallet and prevent product shifting off of the pallet during transport. By way of example, automated systems are known in which the palletized load is placed on a load platform that sits alongside a stretch film roll support mechanism (e.g., a support spindle). To wrap the palletized load the platform and palletized load are rotated causing film to be drawn off of the film roll while the stretch film roll support mechanism is also moved vertically up and down along a mast to cover the full vertical height of the palletized load. In another machine type, the palletized load remains stationary while the film roll support mechanism (e.g., mounted on a mast that extends downward from a rotatable overhead arm) travels around the load to cause film to be drawn off the film roll, while the film roll support mechanism simultaneously moves vertically up and down along the mast.

Such automated machines are commonly used to wrap large numbers of loads over time, and therefore film use is a critical feature for economical use of such machines. Excessive film use results in unnecessary and undesired expense. Monitoring the amount of film used is known in some automated systems. For example, U.S. Pat. No. 8,001,745 discloses monitoring the amount of film used for wrap operations through use of an encoder system that tracks the rotation of a pre-stretch roller of the machine, where the roller rotation is assumed to correspond directly to the length of film drawn off of the roll for a given wrap. In the device of U.S. Pat. No. 8,001,745, a controller can calculate the weight of film used, provided the weight per unit length of the film is known. However, a problem with this system is that in practice the rotation of the pre-stretch roller may not actually correspond to the length of film due, for example, to relative slippage between the film and the pre-stretch roller.

Accordingly, it would be desirable to provide a system that more accurately assesses the amount of film used for wrap operations.

SUMMARY

In one aspect, a stretch film wrapping system for wrapping film about palletized loads includes a wrap location for receiving palletized loads to be wrapped and a film dispensing system having a frame structure, a film roll support mandrel assembly, a pre-stretch roll assembly and a load cell. The frame structure is movable relative to the wrap location during wrap operations. The film roll support mandrel assembly is connected for movement with the frame structure. The pre-stretch roller assembly is connected for movement with the frame structure, and the pre-stretch roller assembly is configured for receiving and pre-stretching film as it is dispensed for wrapping. The load cell is mounted to the frame structure for movement with the frame structure. The film roll support mandrel assembly is mounted to and supported by the load cell such that the load cell provides an output indicative of weight of the film roll support mandrel assembly and any film roll mounted thereon.

In one implementation of the system the only connection between the film roll support mandrel assembly and the frame structure is through the load cell.

In one implementation of the system the film dispensing system is mounted for vertical movement along a mast during wrap operations. In one embodiment the mast is movable about the wrap location during wrap operations. In another embodiment the mast is stationary and a load platform of the wrap location is rotated during wrap operations.

In one implementation of the system the load cell is rigidly mounted to a bracket and the bracket is rigidly mounted to the frame structure.

In one implementation of the system the film roll support mandrel assembly includes a mount block rigidly mounted to the load cell, a mandrel plate rigidly mounted to the mount block, a mandrel shaft extending outward from the mandrel plate and a pair of spaced apart spool members rotatably mounted to mandrel shaft to facilitate rotation of a film roll loaded on the mandrel shaft.

In one embodiment the implementation of the preceding paragraph, the mandrel shaft is fixed to the mandrel plate such that upon removal of the mandrel plate from the mount block the mandrel shaft and spool members remain with the mandrel plate.

In one embodiment of the system of any of the two preceding paragraphs, the mount block includes a load cell connection portion and a mandrel plate connection portion that is angled relative to the load cell connection portion, wherein the mandrel shaft extends upward from the mandrel plate and is offset from vertical.

In one implementation of the system of any of the seven preceding paragraphs, a load mount surface of the load cell is arranged horizontally and upward facing, the film roll support mandrel assembly includes a mount block with a horizontal and downward facing first surface engaged with the load mount surface of the load cell, the mount block including an upward facing second surface offset from horizontal such that a mandrel shaft that extends upwardly away from the second surface is offset from vertical.

In one implementation of the system of any of the eight preceding paragraphs, the system includes a control system for receiving the output of the load cell and configured to determine amount of film used for wrap operations. In one embodiment the control system is configured to determine weight of film used for a wrap operation based upon a difference between the output of the load cell before the wrap operation and the output of the load cell after the wrap operation. In one embodiment, the control system is configured evaluate the output of the load cell before the wrap operation when the film roll support mandrel assembly is in a predefined position, and the control system is configured to evaluate the output of the load cell after the wrap operation when the film roll support assembly is again in the predefined position.

In one aspect, a stretch film wrapping system for wrapping film about loads includes a wrap location for receiving loads to be wrapped; a film dispensing system including a film roll support mandrel assembly supported on a load cell that provides an output indicative of weight of the film roll support mandrel assembly and any film roll mounted thereon; and a control system for receiving the output of the load cell and configured to utilize load cell output to determine amount of film used for wrap operations. In one embodiment the control system is configured to determine weight of film used for a wrap operation based upon a difference between the output of the load cell before the wrap operation and the output of the load cell after the wrap operation. In one embodiment, the control system is configured evaluate the output of the load cell before the wrap operation when the film roll support mandrel assembly is in a predefined position, and the control system is configured to evaluate the output of the load cell after the wrap operation when the film roll support assembly is again in the predefined position.

In another aspect, a stretch film wrapping system for wrapping film about loads includes a wrap location for receiving loads to be wrapped; a film dispensing system including a film roll support mandrel assembly; a load cell positioned relative to the film roll support mandrel assembly so as to provide an output indicative of weight of the film roll support mandrel assembly and any film roll mounted thereon; and a control system for receiving the output of the load cell and configured to utilize load cell output to determine amount of film used for wrap operations. In one embodiment the control system is configured to determine weight of film used for a wrap operation based upon a difference between the output of the load cell before the wrap operation and the output of the load cell after the wrap operation. In one embodiment, the control system is configured evaluate the output of the load cell before the wrap operation when the film roll support mandrel assembly is in a predefined position, and the control system is configured to evaluate the output of the load cell after the wrap operation when the film roll support assembly is again in the predefined position.

In one implementation of any of the foregoing variations, the control system is configured to evaluate the output of the load cell after the film roll support mandrel assembly has been in the predefined position for at least a set time period in order to assure stability of the film roll support mandrel assembly at the time of the evaluation.

In one implementation of any of the foregoing variations, the control system includes an indicator that receives the output from the load cell, the indicator including a wireless transmitter for transmitting data to a wireless receiver associated with a controller of the control system.

DETAILED DESCRIPTION

Figure 1:
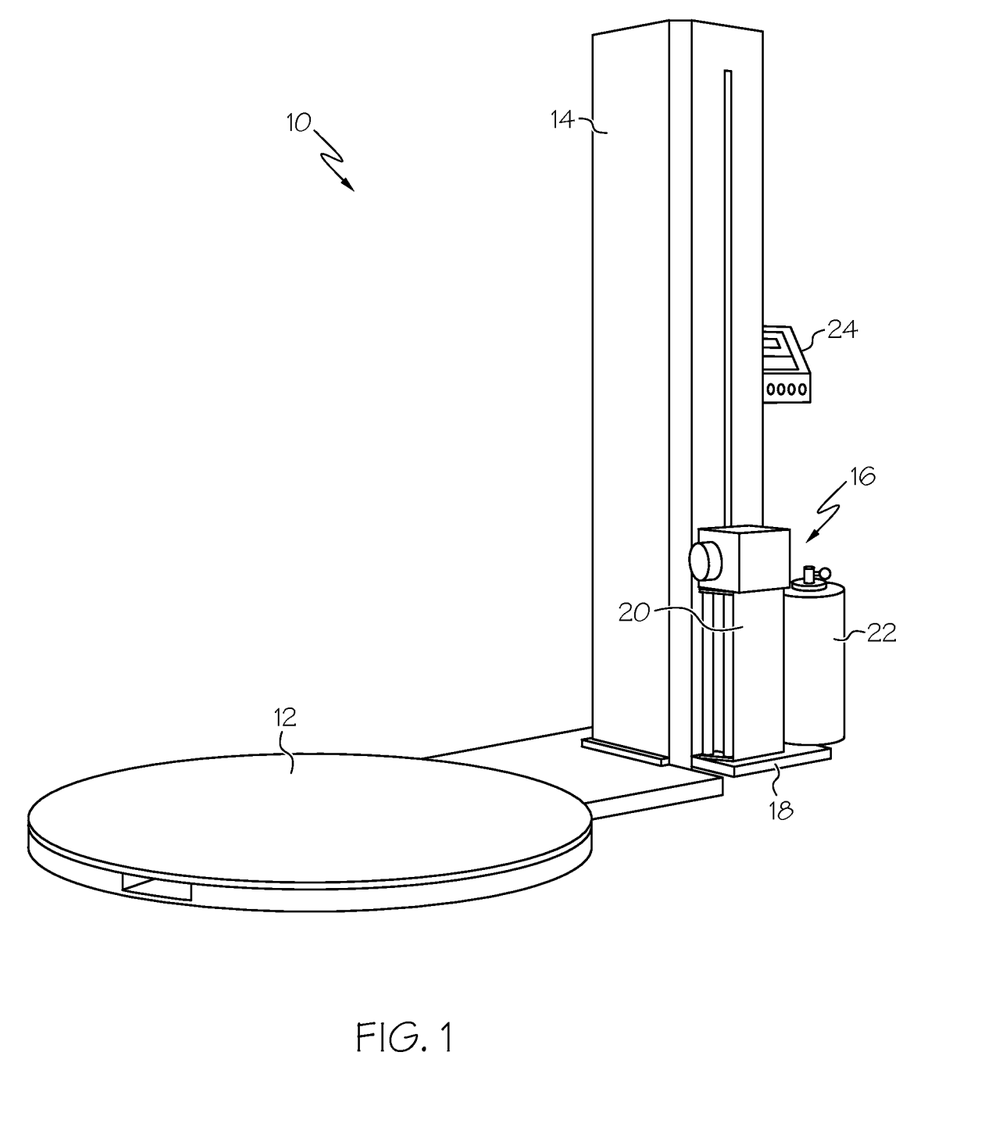
FIG. 1 is a perspective view of one embodiment of a film wrapping machine.

Referring to FIG. 1, one embodiment of a stretch film wrapping system 10 is shown, which includes a rotatable load platform 12 alongside a mast 14 having an associated film dispensing system 16 mounted to the mast and movable up and down along the mast for wrap operations. The film dispensing system 16 includes a frame structure 18 that supports a pre-stretch stretch roller assembly 20 (e.g., typically made up of a set of driven, controlled roller nips). The pre-stretch roller assembly receives film from a film roll 22 mounted on a film roll support mandrel assembly. For wrap operations, a palletized load is placed on the load platform 12 and a free end of the film exiting the pre-stretch roll assembly is attached to the palletized load. The load platform 12 is rotated, thereby rotating the palletized load, and causing film to be drawn from the film dispensing system 16. At the same time, the film dispensing system 16 is moved vertically up and down along the mast 14 to cover the full vertical height of the palletized load. Variations of such machines include fully automatic systems, in which the machine cuts the film at the end of the rotating operation and presses the trailing end of the cut film against the wrapped load, and semi-automatic systems, in which an operator performs the film cut and pressing steps upon completion of the rotation operation. The system 10 includes an operator interface 24 (aka HMI) with associated controller.

Figure 2:
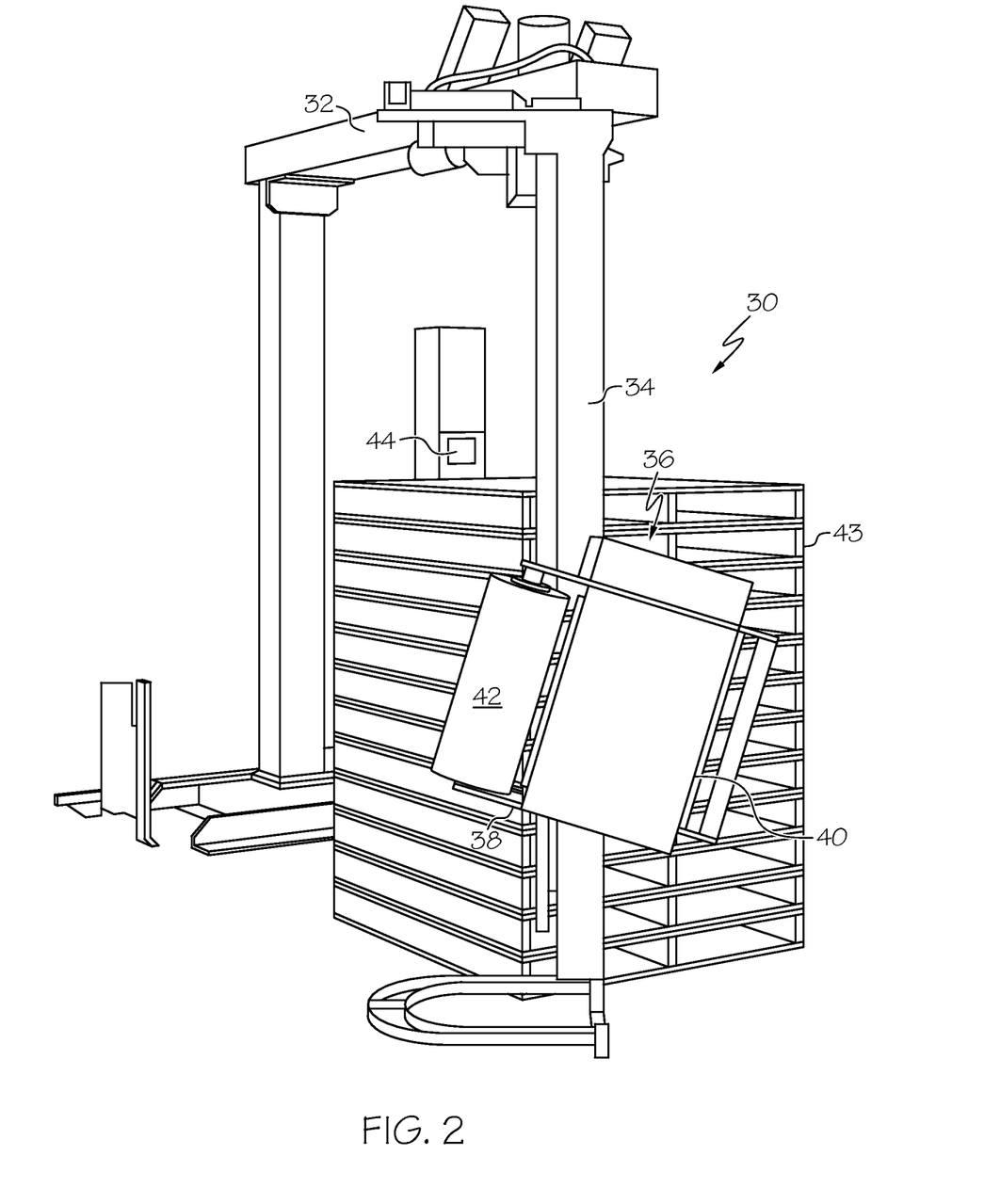
FIG. 2 is a perspective view of another embodiment of a film wrapping machine.

As shown in FIG. 2, another embodiment of a stretch film wrapping system 30 includes an overhead gantry 32 with a rotatable arm. A mast 34 extends downward from the end of the arm and includes an associated film dispensing system 36 mounted to the mast and movable up and down along the mast for wrap operations. The film dispensing system 36 includes a frame structure 38 that supports a pre-stretch roller assembly 40 (e.g., typically made up of a set of driven, controlled roller nips). The pre-stretch roller assembly receives film from a film roll 42 mounted on a film roll support mandrel assembly. For wrap operations, a palletized load 43 is positioned under the gantry 32 and centered below the rotation axis of the overhead arm. A free end of the film exiting the pre-stretch roll assembly is attached to the palletized load. Through rotation of the overhead arm, the mast 34 is then rotated about the palletized load while the palletized load remains stationary, causing the film to be drawn from the film dispensing system 36. At the same time, the film dispensing system 36 is moved vertically up and down along the mast 34 to cover the full vertical height of the palletized load. Similar to the machine of FIG. 1, variations of such overhead gantry type machines can include fully automatic systems and semi-automatic systems. The system 30 includes an operator interface 44 with associated controller to control the wrap operation.

Advantageously, the film dispensing system of either of the above machine types, as well as other existing stretch film wrapper machines, can incorporate a load cell feature that enables the machine to effectively and accurately assesses the amount of film used for wrap operations.

One embodiment is described below with respect to FIGS. 3-6, which primarily relates to a machine of the type shown in FIG. 2 where the film roll is offset from vertical. Other embodiments are contemplated.

Figure 3:
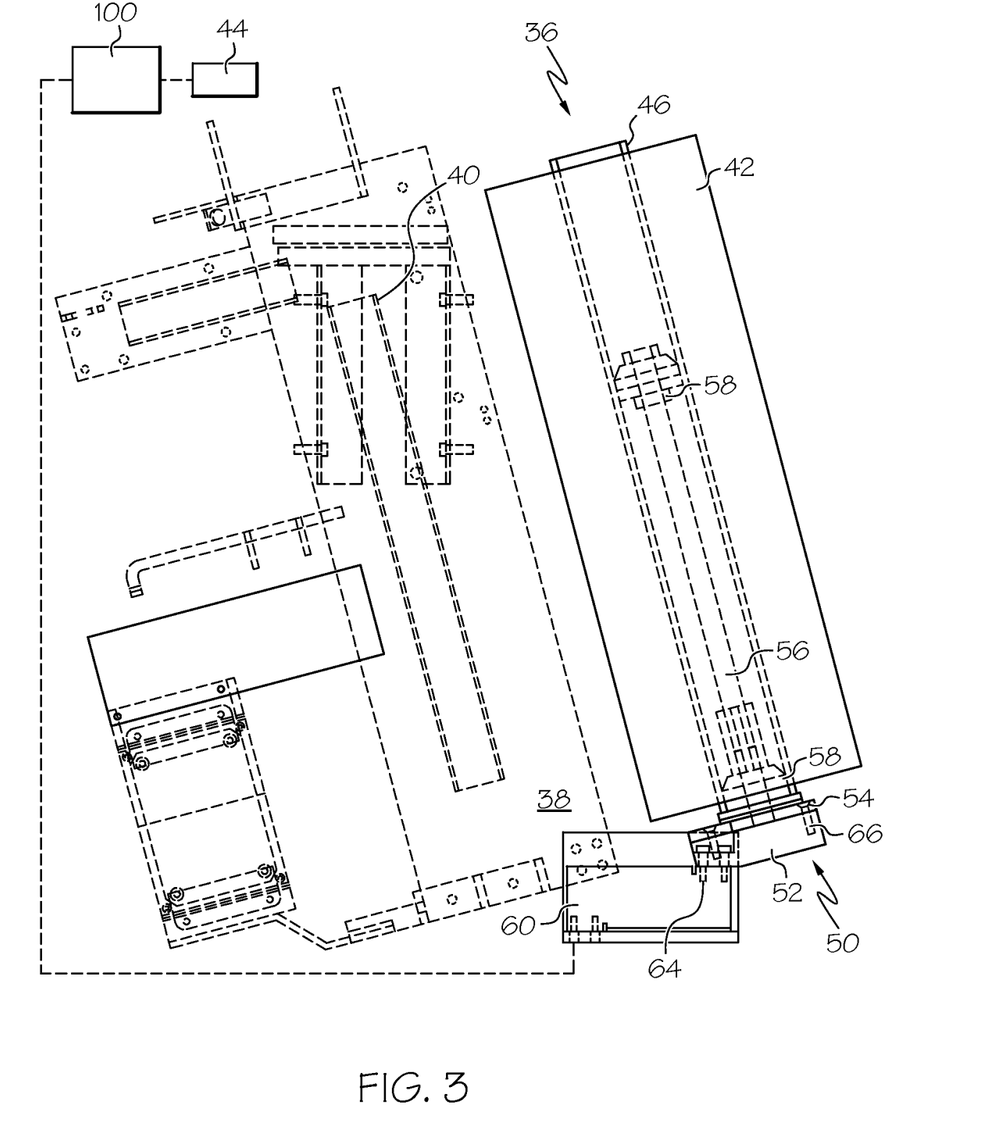
FIG. 3 is a schematic depiction of one embodiment of a film dispensing system including a load cell.
Figure 4:
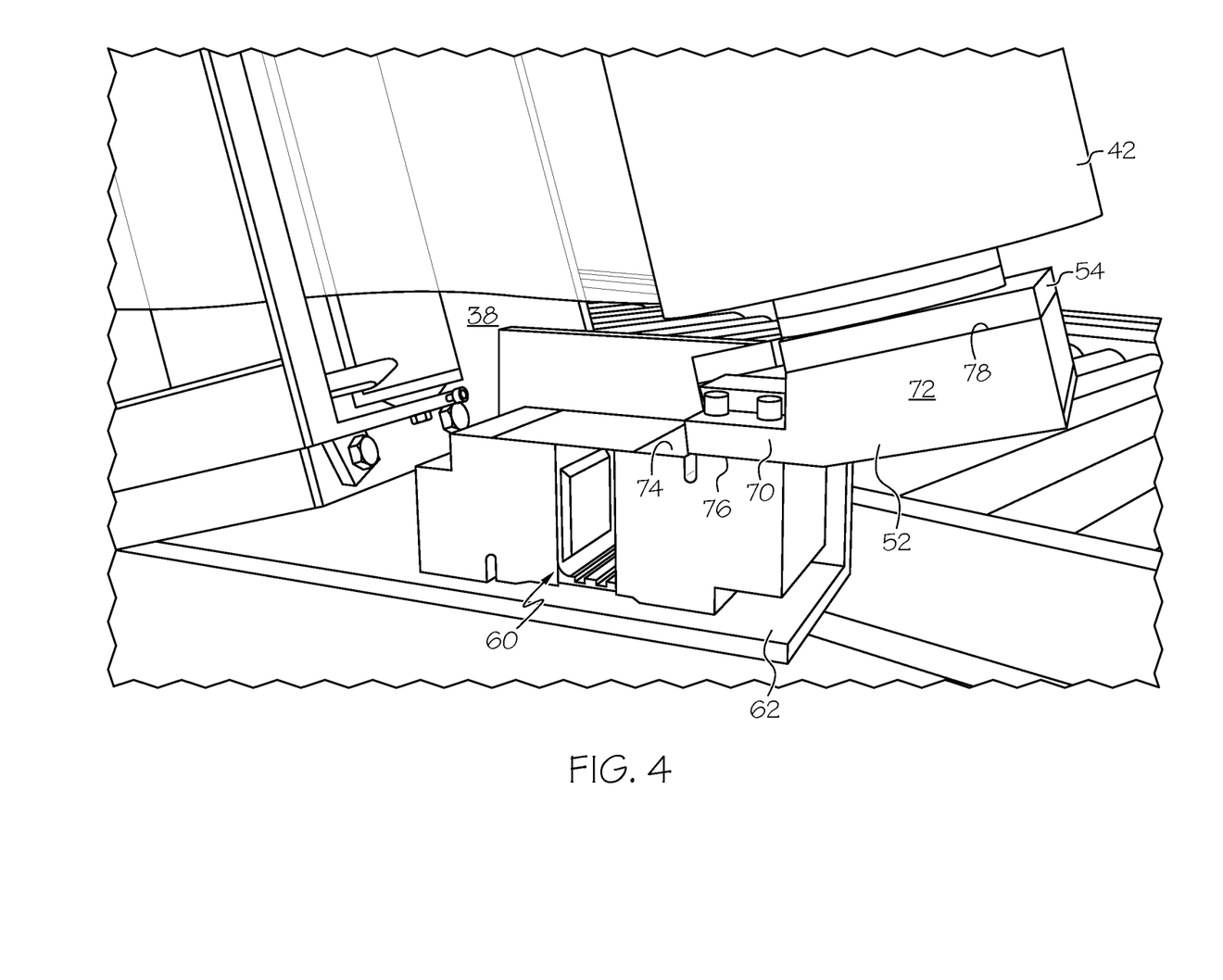
FIGS. 4-6 are partial perspective view of the film dispensing system of FIG. 3.
Figure 5:
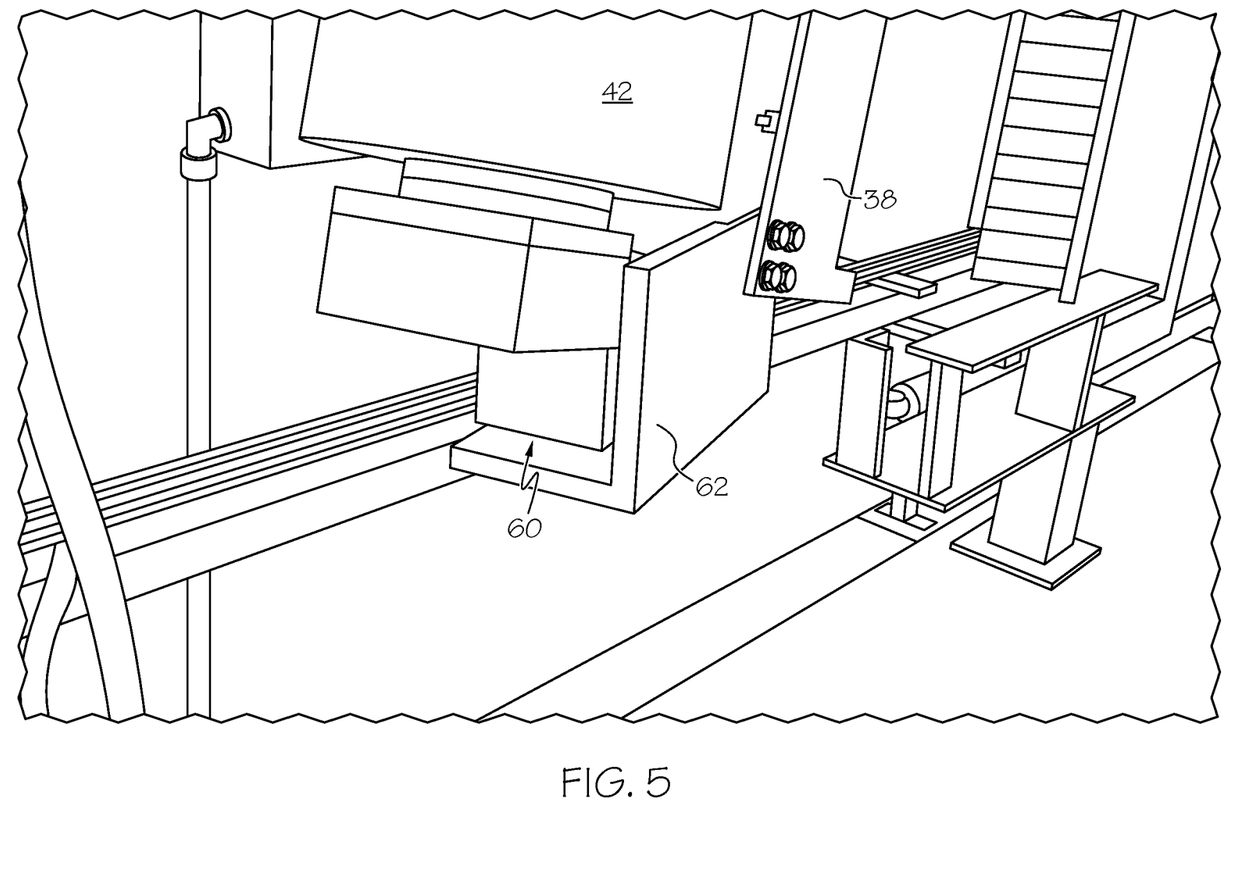
Figure 6:
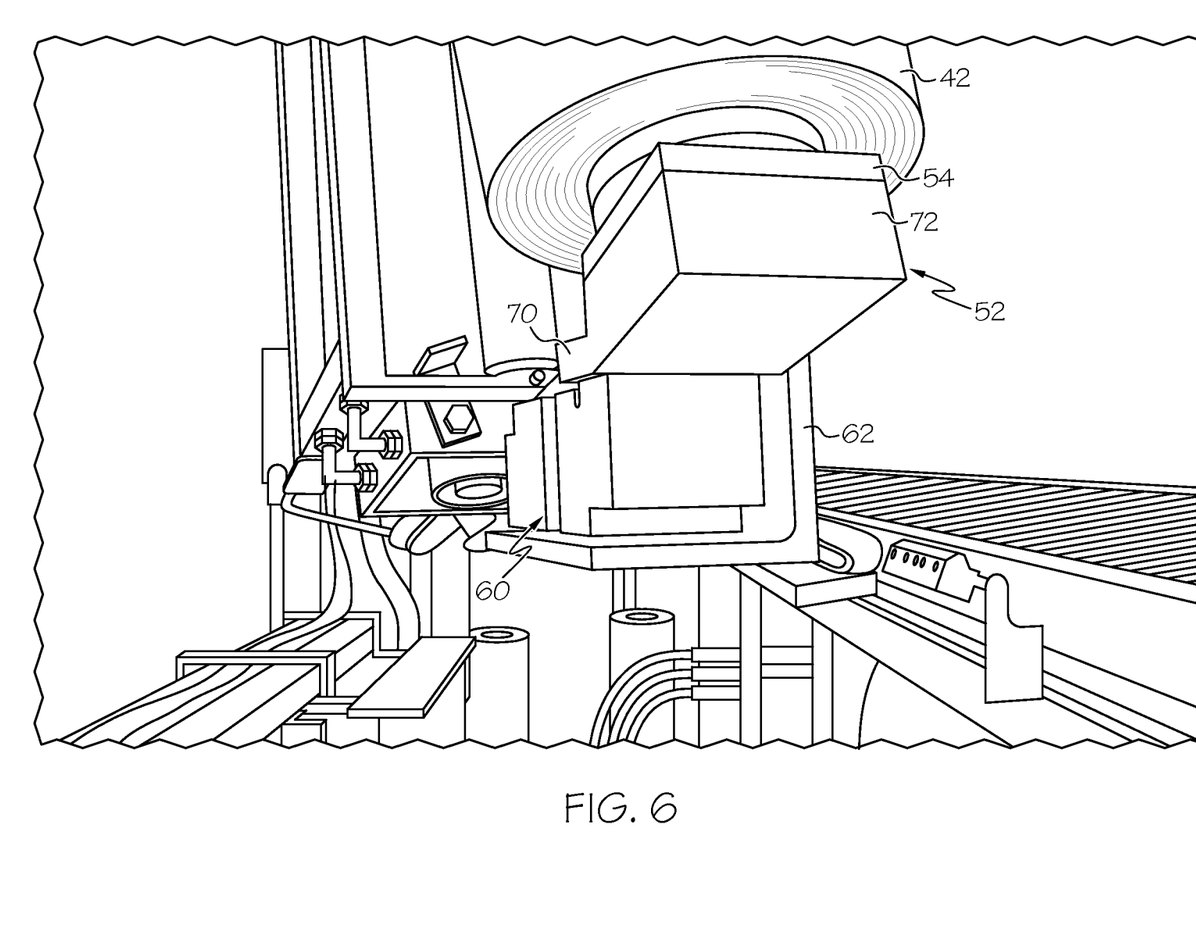

Referring to the schematic of FIG. 3 where film dispensing system 36 is shown, and the partial perspective views of FIGS. 4-6, the film roll 42, which includes a core 46, is mounted on a film roll support mandrel assembly 50 that includes a mount block 52, a mandrel plate 54, a mandrel shaft 56 and spaced apart spool members 58. A load cell 60 is rigidly mounted to the frame 38, such as by an L-shaped plate 62 bolted to the frame 38 in the illustrated embodiment. The film roll support mandrel assembly is mounted to and supported by the load cell 60 such that the load cell 60 provides an output indicative of weight of the film roll support mandrel assembly and any film roll mounted thereon. In the illustrated embodiment, the mount block 52 is rigidly mounted to the load cell (e.g., via fasteners 64), the mandrel plate 54 is rigidly mounted to the mount block 52 (e.g., via fasteners 66), the mandrel shaft 56 is fixed to the mandrel plate (e.g., via a threaded end) and extends outward from the mandrel plate 54, and the pair of spaced apart spool members 58 are rotatably mounted to mandrel shaft 56 to facilitate rotation of the film roll 42 loaded on the mandrel shaft.

Referring more specifically to the mount block to load cell connection, the illustrated mount block 52 includes a load cell connection portion 70 and a mandrel plate connection portion 72 that is angled relative to the load cell connection portion 70. This arrangement facilitates the orientation of the mandrel shaft 56 extending upward from the mandrel plate 54 in a manner that is offset from vertical as shown. A load mount surface 74 of the load cell 60 is arranged horizontally and upward facing. Load cell connection portion 70 of the mount block includes a horizontal and downward facing surface 76 engaged with the load mount surface of the load cell. Mandrel plate connection portion 72 includes an upward facing surface 78 offset from horizontal.

In typical film roll support systems in which the film roll is mounted in an orientation that is offset from vertical, the film roll is connected to the frame structure by both lower and upper mandrel support structure. Notably, in the illustrated embodiment the only connection between the film roll support mandrel assembly 50 and the frame structure 37 is through the load cell 60, which helps assure more accurate weight measurements. This is achieved using the elongated mandrel shaft 56, with spool members 58 at both ends, to provide adequate lateral support for the film roll. In this regard, the mandrel shaft 56 is preferably long enough such that the upper spool member 58 is located upward beyond the mid-point of the length of the film roll mounted thereon. The upper end of the mounted film roll is unsupported, and lateral movement of the upper end of the film roll is restricted by the upper spool member 58 and the rigidity of the mandrel shaft 56. Film rolls are loaded and unloaded by simply sliding them along the length of the mandrel shaft.

A controller 100 of the system receives the output of the load cell 60 and is configured to utilize the load cell output to determine amount of film used for wrap operations. More specifically, the controller 100 is configured (e.g., programmed) to determine weight of film used for a wrap operation based upon a difference between the output of the load cell before the wrap operation and the output of the load cell after the wrap operation. To help assure consistency and accuracy, the controller 100 can be configured evaluate the output of the load cell both before and after the wrap operation when the film roll support mandrel assembly is in the same predefined position (e.g., a standby position). Moreover, given that stability of the load cell and load is important to accurate measurements, the controller 100 can be configured to evaluate the output of the load cell after the film roll support mandrel assembly has been in the predefined position for at least a set time period.

In one embodiment, the load cell is wired to an indicator located on the carriage assembly (e.g., the moving frame structure of the film roll dispensing system 36). The output of the indicator is then transmitted by a wireless serial radio mounted on the carriage to another wireless serial radio which is wired to the controller. The wireless serial radios consist of a pair that are coupled by a process of teaching. This results in a master/slave pair. This configuration would typically only be used on systems with a rotatable arm (e.g., per FIG. 2). The wireless serial radios would not be necessary on a systems with a load rotating platform (e.g., per FIG. 1), as in such cases the indicator may be wired directly to the controller by a serial cable.

The weight data from wrap operations can be used to calculate cost based on user input from the HMI. The user enters applicable cost per pound (or can be configured for other desired units of measurement) for the film being used. The controller can then calculate the cost for each wrap based upon the weight of film used for each wrap. The user can make adjustments from the HMI to the wrap cycle to achieve a reduction in cost. For example, changes to the number of times the film is wrapped about the load or changes to the amount of film stretch achieved can be set. Other wrap parameters could also be adjusted.

Notably, the load cell based system described herein provides direct measurement of film weight that is not affected by slippage etc., so as to enable truly accurate and reliable tracking of film use. In one embodiment, a strain gauge type load cell is used (e.g., the RLPWM12 Single-Point, Aluminum load cell available from Rice Lake Weighing Systems at www.ricelake.com). However, other load cells could be used.

It is to be clearly understood that the above description is intended by way of illustration and example only and is not intended to be taken by way of limitation, and that changes and modifications are possible.

What is claimed is:

1. A stretch film wrapping system for wrapping film about palletized loads, comprising:
   a wrap location for receiving palletized loads to be wrapped;
   a film dispensing system including:
      a frame structure that is movable relative to the wrap location during wrap operations;
      a film roll support mandrel assembly connected for movement with the frame structure;
      a pre-stretch roller assembly connected for movement with the frame structure, the pre-stretch roller assembly configured for receiving and pre-stretching film as it is dispensed for wrapping;
      a load cell mounted to the frame structure for movement with the frame structure, the load cell including an output;
      wherein the film roll support mandrel assembly is mounted to and supported by the load cell such that the film roll support mandrel assembly acts as a load on the load cell and the output of the load cell indicates weight of the film roll support mandrel assembly and any film roll mounted thereon.

2. The system of claim 1 wherein the only connection between the film roll support mandrel assembly and the frame structure is through the load cell.

3. The system of claim 1 wherein the film dispensing system is mounted for vertical movement along a mast during wrap operations.

4. The system of claim 3 wherein the mast is either (i) movable about the wrap location during wrap operations or (ii) stationary and a load platform of the wrap location is rotated during wrap operations.

5. The system of claim 1 wherein the load cell is rigidly mounted to a bracket and the bracket is rigidly mounted to the frame structure.

6. The system of claim 1 wherein the film roll support mandrel assembly includes:
   a mount block rigidly mounted to the load cell;
   a mandrel plate rigidly mounted to the mount block;

a mandrel shaft extending outward from the mandrel plate; and a pair of spaced apart spool members rotatably mounted to mandrel shaft to facilitate rotation of a film roll loaded on the mandrel shaft.

7. The system of claim 6 wherein the mandrel shaft is fixed to the mandrel plate such that upon removal of the mandrel plate from the mount block the mandrel shaft and spool members remain with the mandrel plate.

8. The system of claim 6 wherein the mount block includes a load cell connection portion and a mandrel plate connection portion that is angled relative to the load cell connection portion, wherein the mandrel shaft extends upward from the mandrel plate and is offset at an angle from a vertical orientation.

9. The system of claim 1 wherein a load mount surface of the load cell is arranged horizontally and upward facing, the film roll support mandrel assembly includes a mount block with a horizontal and downward facing first surface engaged with the load mount surface of the load cell, the mount block includes an upward facing second surface offset from horizontal, a mandrel shaft extends upwardly away from the second surface and is offset at an angle from a vertical orientation.

10. The system of claim 1, further comprising:
a controller for receiving the output of the load cell and configured to determine an amount of film used for wrap operations.

11. The system of claim 10 wherein the controller is configured to determine a weight of film used for a wrap operation based upon a difference between the output of the load cell before the wrap operation and the output of the load cell after the wrap operation.

12. The system of claim 11 wherein the controller is configured evaluate the output of the load cell before the wrap operation when the film roll support mandrel assembly is in a predefined position, and the controller is configured to evaluate the output of the load cell after the wrap operation when the film roll support assembly is again in the predefined position.

13. A stretch film wrapping system for wrapping film about loads, comprising:
a wrap location for receiving loads to be wrapped;
a film dispensing system including a load cell having an output, wherein a film roll support mandrel assembly is supported on the load cell and the load cell is positioned below the film roll support mandrel assembly so that the output of the load cell indicates a weight of the film roll support mandrel assembly and any film roll mounted thereon;
a control system for receiving the output of the load cell and configured to utilize the load cell output to determine amount of film used for wrap operations.

14. The system of claim 13 wherein the control system is configured to determine a weight of film used for a wrap operation based upon a difference between the output of the load cell before the wrap operation and the output of the load cell after the wrap operation.

15. The system of claim 14 wherein the control system is configured evaluate the output of the load cell before the wrap operation when the film roll support mandrel assembly is in a predefined position, and the control system is configured to evaluate the output of the load cell after the wrap operation when the film roll support assembly is again in the predefined position.

16. A stretch film wrapping system for wrapping film about loads, comprising:
a wrap location for receiving loads to be wrapped;
a film dispensing system including a film roll support mandrel assembly with a film roll mounted thereon;
a load cell including an output, the load cell positioned relative to the film roll support mandrel assembly so that the output of the load cell indicates weight of the film roll support mandrel assembly and the film roll mounted thereon; and
a control system for receiving the output of the load cell and configured to utilize the output of the load cell to determine amount of film used for wrap operations.

17. The system of claim 16 wherein the control system is configured to determine a weight of film used for a wrap operation based upon a difference between the output of the load cell before the wrap operation and the output of the load cell after the wrap operation.

18. The system of claim 17 wherein the control system is configured to evaluate the output of the load cell before the wrap operation when the film roll support mandrel assembly is in a predefined position, and the control system is configured to evaluate the output of the load cell after the wrap operation when the film roll support assembly is again in the predefined position.

19. The system of claim 18 wherein the control system is configured to evaluate the output of the load cell after the film roll support mandrel assembly has been in the predefined position for at least a set time period in order to assure stability of the film roll support mandrel assembly at the time of the evaluation.

20. The system of claim 17 wherein the control system includes an indicator that receives the output from the load cell, the indicator including a wireless transmitter for transmitting data to a wireless receiver associated with a controller of the control system.

21. A stretch film wrapping system for wrapping film about loads, comprising:
a wrap location for receiving loads to be wrapped;
a load cell having an output;
a film dispensing system including a film roll support mandrel assembly with a film roll mounted thereon, the film roll support mandrel assembly supported as a load that acts on the load cell so that the output of the load cell indicates a weight of the film roll support mandrel assembly and the film roll mounted thereon; and
a control system for receiving the output of the load cell and configured to utilize the output of the load cell to determine an amount of film used for wrap operations;
wherein a load mount surface of the load cell is arranged horizontally and upward facing, the film roll support mandrel assembly includes a mount block with a horizontal and downward facing first surface engaged with the load mount surface of the load cell, the mount block includes an upward facing second surface offset from horizontal, and a mandrel shaft extends upwardly away from the second surface, the mandrel shaft having a lengthwise axis that is offset at a non-zero angle from a vertical axis.

* * * * *